United States Patent [19]

Zinner

[11] Patent Number: 4,580,930
[45] Date of Patent: Apr. 8, 1986

[54] CHIPPING TOOL WITH CLAMPING CUTTER

[75] Inventor: Karl Zinner, Nuremberg, Fed. Rep. of Germany

[73] Assignee: Firma Zinner GmbH, Nuremberg, Fed. Rep. of Germany

[21] Appl. No.: 491,628

[22] Filed: May 5, 1983

[30] Foreign Application Priority Data

May 21, 1982 [DE] Fed. Rep. of Germany ....... 3219150

[51] Int. Cl.$^4$ ............................................. B26D 1/00
[52] U.S. Cl. .................................... 407/110; 407/50; 407/72; 407/117
[58] Field of Search ............... 407/108, 109, 110, 117, 407/33, 66, 72, 50; 83/845

[56] References Cited

U.S. PATENT DOCUMENTS

| 174,216 | 2/1876 | Emerson | 83/845 |
|---|---|---|---|
| 383,103 | 5/1888 | Cook | 83/845 |
| 1,608,182 | 11/1926 | Pospiech | 83/845 |
| 3,523,349 | 8/1970 | Pollington et al. | 407/110 |
| 3,785,021 | 1/1974 | Norgren | 407/72 |
| 3,825,981 | 7/1974 | Cochran et al. | 407/67 |
| 3,894,322 | 7/1975 | Pano | 407/110 |
| 4,195,956 | 4/1980 | Mihic | 407/108 |
| 4,363,576 | 12/1982 | Zweekly | 407/109 |

FOREIGN PATENT DOCUMENTS

| 2755003 | 6/1978 | Fed. Rep. of Germany | 407/109 |
|---|---|---|---|
| 563229 | 7/1977 | U.S.S.R. | 407/110 |
| 772733 | 10/1980 | U.S.S.R. | 407/109 |

Primary Examiner—Leonidas Vlachos
Attorney, Agent, or Firm—Jordan and Hamburg

[57] ABSTRACT

A tool for cutting material includes a holding member having a slit-like opening forming first and second spaced jaws, a cutter insert mounted between the spaced jaws in the slit-like opening, and a positioning arrangement on the holding member positioning the cutter insert in the opening, whereby the spaced jaws hold the cutter insert with a predetermined clamping pressure providing for proportional increase of the clamping pressure relative to the cutting pressure applied to the cutter insert.

20 Claims, 19 Drawing Figures

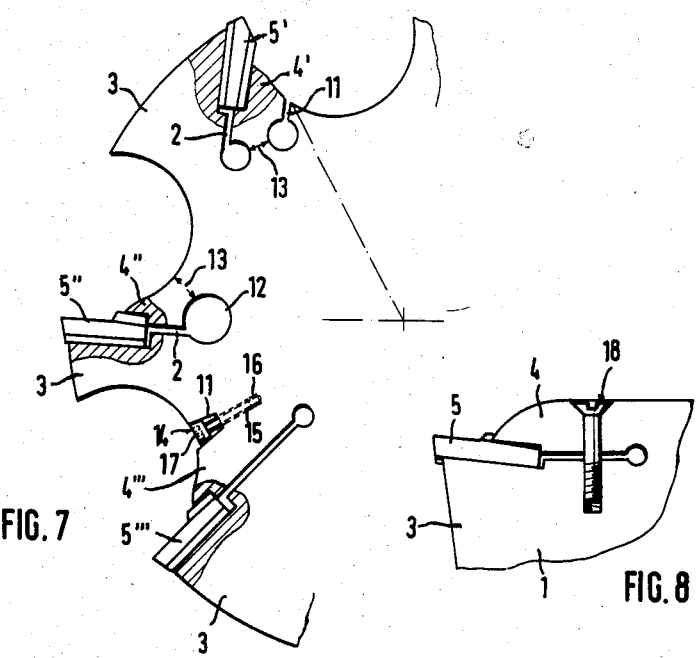
FIG. 7
FIG. 8
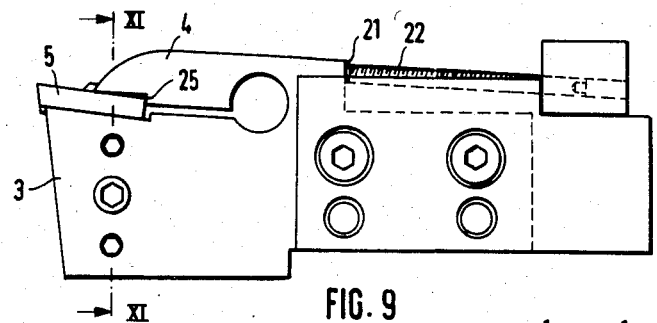
FIG. 9
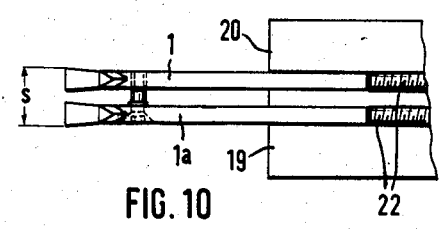
FIG. 10
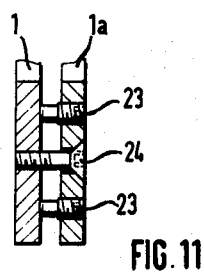
FIG. 11

CHIPPING TOOL WITH CLAMPING CUTTER

BACKGROUND OF THE INVENTION

The invention relates to a chipping tool with a holder, slit in a fork-like fashion, for the clamping of a cutting insert, in particular to a recessing tool with the holder plate slit in a fork-like fashion and with the clamping slit formed in such a way that the jaws hold the cutting insert with a predetermined clamping force.

Similar recessing tools, especially recessing tools known as grooving tools, have previously been formed in such a way that the holding portion of the cutting insert is pushed in loosely from the front, having a minimal fitting insert, into the clamping slit of the holder plate. This obviously results in a very insufficient holding effect. In a different embodiment of such a self-clamping system with strongly conical formation and without a fixed contact point, the result is a tool which is basically only suited for grooving but not for recessing. Because of the wedge shape, the material expands so that neither an exact height setting nor a precise repetition accuracy is assured.

It is thus the object of the invention to produce a recessing tool which is easy to manufacture, and with the mounting system of the cutting insert allowing an exact, repetitious accurate holding at predetermined clamping force as well as under actual clamping conditions without having to fear that the cutting insert will be pushed out from the forks of the holding plate.

In order to accomplish this object, a tool of the initially described type has an insert limit contact point for the cutting insert and/or for the upper clamping jaws so that the cutting pressure leads to a proportional increase of the clamping tension.

This feature distinguishes the object of the invention from the prior art (compare, for example, German Pat. Nos. 31 33 029, 23 05 111, and 22 06 654) in which an insert limit contact point, if at all present, is arranged on the lower clamping jaws so that the cutting powers lead to no change in the clamping tension. Extensive experiments forming the basis for the present invention, have now shown that only by the increased clamping power caused by the cutting pressure is a really effective holding possible under hard operational requirements which manages without the need for additional screw clampings and at the same time allows an extremely easy loosening and exchange of the cutting inserts.

The clamping slit can be formed in such a way that the jaws of the holding plate hold the cutting inserts by a tool in an expandable fashion at a preset clamping tension. Providing a clamping slit, which has a normal resting position opening which is smaller than the clamping part of the cutting insert to be held, in combination with its expandability, which can be particularly favorably achieved by providing an essentially oval slit area for the insertion of a corresponding key, leads to a really solid holding of the cutting insert, which is sufficient even under unfavorable working conditions so that not only a grooving and a recessing tool is possible, but also a chipping tool with cutting plates clamped in this manner.

An additional embodiment of the invention provides for the clamping areas of the expandable upper leg in the working position ascending slightly inwardly, when compared to the clamping area of the cutting insert, which can be most easily accomplished when the clamping surfaces of the holding plates are formed in a backward, preferably parallel fashion, to one another, or slightly converge; however, in any case converge less than the clamping surfaces of the cutting inserts.

This latter embodiment, in which the converging formation of the clamping area has been chosen at the cutting body in order to achieve the actual clamping point at a considerable distance from the back end of the cutting insert, enables an essentially simpler working in of clamping areas of the clamping legs of the holder plate, which run parallel to one another, compared to the provision of backward diverging clamping areas in the holder plate, which would lead to the same effect.

In order to achieve a stable hold against transverse forces, it is an additional characteristic of the present invention to have at least the clamping surfaces of at least one of the clamping jaws correspond to a preferably triangular indentation or arching for the formation of the adjacent clamping surfaces of the cutting insert. By double prismatic formation of the holding segment, or reversely, by triangular grooves in the clamping areas of the cutting insert, opposite to one another, particularly good hold and security can be established against transverse stress.

The expandable upper clamping jaws can, according to the invention, be formed by a spring slit of the holding plate above the clamping slit, which enables the fastening of such cutting inserts by a simple holding at any point on a relatively large plate. This design is particularly suited for rotating tools, for example, saw blades with loosely inserted tempered cutting inserts forming the cutting ends.

It is further within the framework of the invention to push the expandable upper clamping jaw against the lower clamping jaw by a clamping screw. Besides the simplest type of expansion, which is, however, only possible in relatively thick holding plates in which the clamping screw transversely intersects both clamping jaws, a construction is possible, which is very favorable, and in which the clamping screw, having a conical head, can be inserted into the screw head of a spring slit which is essentially parallel and inclined towards the clamping slit. When screwing in the clamping screw, the conical head expands the spring slit and thereby pushes the expandable upper clamping leg against the rigid lower clamping leg of the holding arrangement according to the invention.

The insert limit contact point, so important for the invention, which assures increased clamping power at increased cutting pressure, can preferably consist of a contact angle, related to the jaw, and essentially L-shaped, onto which the cutting insert rests with its back side. In order to be able to use it even under the most extreme conditions, for example, when inserting the clamping holder, according to the invention, for saw blades with clamped cutting inserts, which rotate with more than ten thousand turns, without running the risk of the cutting inserts being hurled out, an additional embodiment of the invention provides for the cutting plate having a recess on the bottom side to receive a safety cam or pin located above the bearing surface area of the lower jaw. Such a safety cam or pin assures, even in the most unfavorable case of loss of clamping tension, that the cutting insert is not hurled out of its mounting.

In order to assure a simple insertion of the cutting insert in spite of this safety cam, an additional embodiment of the invention provides for the back lower corner of the clamping portion to have a rounding. This enables an angular insertion of the cutting insert between the jaws, without the need for a particularly strong tool expanding the jaw. This has the great advantage that the cutting inserts can be easily pushed into the mounting from the front without the need for special tools. Only the loosening requires the use of a screwdriver or a similar tool in most cases to lift the upper jaw.

It was initially mentioned in connection with the holder for the cutting insert that the holder was slit in a fork-like fashion. This, however, does not mean that the holder with its two jaws has to be a one-part component. It is on the contrary possible—and this in turn allows the mounting of any shape cutting plates for milling or chipping tools of all types—to form the upper jaw with the insert limit contact point as a component, which is loosely mounted in the recess of a holder, the one sidewall of which forming the lower jaw. In heavy metal cutting, there is always the danger of the jaw being destroyed as well, leading, in the case of multiple tools, to the entire tool becoming unusable. The possibility of exchanging the upper jaw, which is a loosely mounted separate component, effectively alleviates this problem. Furthermore, it also eliminates the metal cutting difficulties which would arise if split mounting plates were not used as in recessing tools, but wide holders for the insertion of large cutting plates.

For the fastening of the previously-mentioned component, the bearing portion of the component, which is fastened to the holder with one single mounting screw, can have an opening, preferably open towards the bottom, for a tilt-stop arrangement which engages into the opening. This enables the simple insertion of the component into the opening of the holder from the side, and in spite of using only one fastening screw, the longitudinal axis of the jaws cannot be tilted since the tilt-stop contact point, which can be in the form of a cross pin, creates a second distanced fastening point.

The lateral bearing for the cutting plate can be provided in the recess of the holder or formed on or in the upper jaw.

This last arrangement of the bearing on the upper jaw has the advantage that any shape cutting plates can be clamped into the same basic holder, provided that a suitable component is used, forming the upper jaw. Furthermore, this enables the use of tensioning elements for the mounting of triangular plates and plates of still more complex shapes.

In order to achieve the desired initial clamping tension in the mounting of cutting plates, according to the invention, these should on their upper side have an elevation forming a sliding ramp. The sliding ramps of the elevation provide the automatic expansion of the upper jaws when pushing or striking in the cutting plates which, of course, analoguous to the above-described cutting inserts, can have an opening on the bottom side for a safety cam in the bearing surface area.

The very narrowly built recessing tools of the invention are also very suitable for the construction of multiple tools. In this connection, several holding plates with clamped in cutting inserts are held parallel to one another by using gage block-like distancing pieces in a holding recess of a holder, with the mounting frame overlapping the plate package from above and the sides, the mounting frame being mounted in turn through a clamping wedge.

According to a particularly favorable embodiment, two holder plates, which according to the previously-described holding system have cutting inserts, run parallel to one another, and have their holding plates projecting forward with their clamping portion with adjusting arrangements provided in the area of the free end of the holder plates for the decrease and/or increase of the holder plate distance.

This changing of the holder plate distance enables the simple fitting of commercial regulating plates, eliminating the need for the production of a recessing slit of predetermined width to provide a correspondingly wide cutting tool. This is very circumstantial, especially in the case of non-standard widths, when special cutting inserts have to be provided. Further, the construction according to the invention provides for a continuous, very simple regulation during the unavoidable wear and tear of the cutting inserts as to the desired gage block.

The regulation arrangement of the invention can be most simply realized by providing expansion screws, which can be screwed into a first holder plate, supported by a second, and with additional counterscrews intersecting the first holder plate and being screwed into the second holder plate. By such expansion and counter screws, the holding plates can be brought close to one another or placed at a distance from one another so that together with a simple applied slide rule, a desired adjustment or regulation can be accomplished with few manipulations.

Additional advantages, characteristics and details of the invention can be found in the subsequent description of an embodiment as well as from the drawings.

BRIEF DESCRIPTION OF THE DRAWINGS

FIG. 7 is a portion of a saw blade with cutting inserts clamped into it in various ways.

FIG. 8 is a partial view of a holding plate with a clamped in cutting insert which is additionally secured by a clamping screw.

FIGS. 9 to 11 are a side view, a top view and an enlarged cross-sectional view taken along the line XI—XI through a cutting insert with two holding plates being clamped into a holder backwards and expanded towards each other at their front ends with clamped cutting inserts.

DESCRIPTION OF THE PREFERRED EMBODIMENTS

Figure 3:
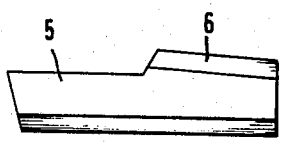
FIG. 3 is a view of the cutting insert.
Figure 4:
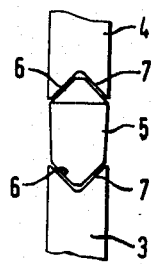
FIGS. 4 to 6 are various embodiments of the formation of the clamping portion of the cutting insert and the clamping jaws.
Figure 5:
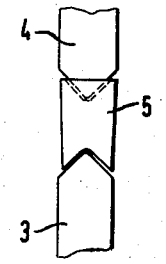
Figure 6:
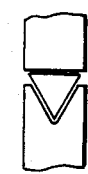

The numeral 1 designates a holder plate in which two jaws are formed by a slit 2, the jaws being a rigid lower jaw 3 and an expandable upper jaw 4. The power necessary for the expansion of the upper jaw 4, which can be reversed as clamping power, results from the shape of the slit, that is, simply expressed, by the thickness at the end of the fork arm and its length 1. Between these two fork arms 3 and 4, a cutting insert 5 is mounted which, according to FIGS. 1-3, has a prism 6 in the area of its upper and lower holding portions while the two jaws 3 and 4 have corresponding triangular grooves 7. FIG. 5 shows the inverse formation of the clamping area to the configuration shown in FIG. 4, while FIG. 6 shows how a simplified design would be possible as well, in which the upper clamping areas are level.

The clamping areas of jaws 3 and 7 formed as triangular grooves run in the insertion direction 8 of the cutting insert, that is, towards the interior of the holder and parallel to one another, which simplifies the working in of these areas when producing holder plate 1. The prismatic clamping areas 6 of the cutting insert 5 are therefore formed converging towards one another inversely. Thus it is assured that, even when expanding the upper movable jaw, the resultant, divergent formation of clamping areas 7 towards one another is still smaller than the divergence of clamping areas 6 in a forward direction so that at any rate the jaw at the front end, i.e. in area 9, is adjacent to this at a distance from the back cutting insert. If this were not the case, then the cutting insert would swing toward the front during the clamping effect. The expansion of jaw 4 in relationship to jaw 3 can be effectuated by inserting and turning an elliptical key in portion 10 of clamping slit 2. However, instead of this, a parallel slit formation can be provided as in FIG. 7 so that the expansion can be done by a common screw driver.

The saw blade shown in sections in FIG. 7 represents various additional variations of the formation of the cutting insert according to the invention. Cutting insert 5' is held by an upper jaw 4' which, in turn, is formed so that a spring slit 11 is provided which is essentially parallel to the actual clamping slit 2. In cutting insert 5'', the clamping slit 2 is placed and provided with a backside enlarged recess 12 so that a small bridge is formed at 13 resulting in an expandable upper jaw 4''.

In the mounting of cutting insert 5''' finally, a clamping screw 14 is additionally provided, which pushes the expanded upper jaw 4''' against the cutting insert 5''' by the elastic spring measurement resulting when expanding. Clamping screw 14 can be screwed into a counter-screw thread portion 16 at the interior end of spring slit 11 with a screw thread portion 15 so that its conically formed head 17 swings out separating the spring slit 11 stronger at its front end and thus pushing clamping jaw 4''' against the lower clamping jaw 3.

FIG. 8 shows an additional possibility of the mounting of jaws 3 and 4 toward each other by a clamping screw 18, however, this is only suitable for relatively thick holding plates.

FIGS. 9-11 show two holding plates 1 and 1a mounted parallel to one another in a holder 19 which project a good deal forward over the holder 19. The mounting of the plates on the holder 19 can be accomplished by not shown clamping screws intersecting the opening shown in FIG. 1. The exact frontal projection length of holder plates 1 and 1a over the front end 20 of holder 21 can be set by the clamping screw 22 adjacent to shoulder 21. Most important in the construction according to FIGS. 9 and 11, are two expansion screws 23 threaded into holder 1a, supported by the holder plate 1 as well as a counter screw 24 arranged between these which engages into a screw thread portion of holder plate 1 with its screw thread portion supported by holder plate 1a. By means of these screws, the distance of the plates and thus the cutting width can be easily adjusted, so that by using commercial cutting inserts, any desired cutting width can be set in a step-wise fashion and vice versa, the unavoidable wear and tear of the cutting edges by corresponding subsequent expansion of holder plates 1 and 1a can be eliminated.

Figure 1:
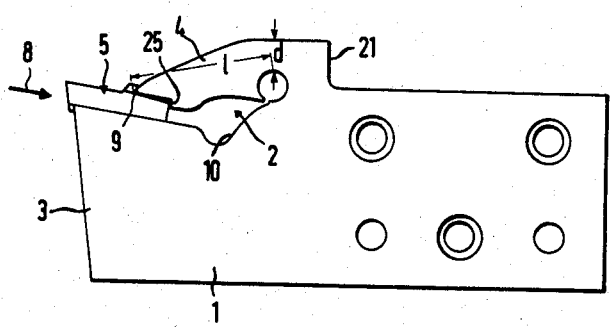
FIG. 1 is a side view of the holding plate according to the invention with clamped in cutting insert.
Figure 2:
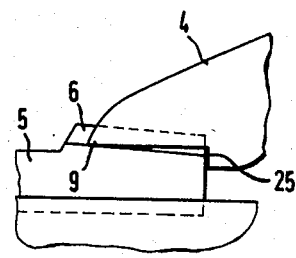
FIG. 2 is an enlarged view of the clamping portion of the holding plate.

In order to clarify this process, we would like to point out that with the cutting insert 5 in FIGS. 1, 7, 8, and 8 well fitted, a leverage effect is created at contact point 25, additionally clamping the cutting insert into the double prism system.

Figure 12:
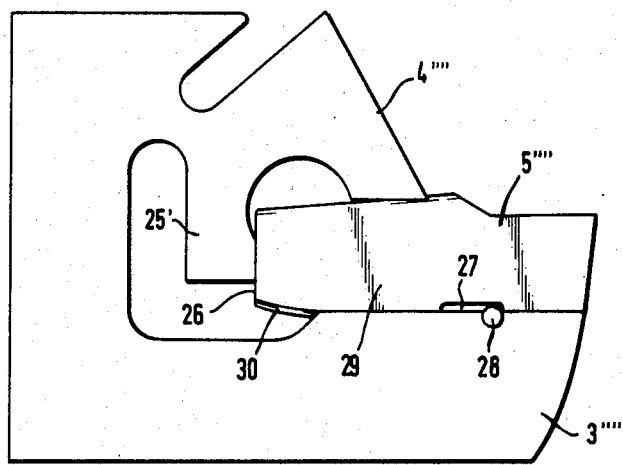
FIG. 12 is an enlarged view of the clamping area of a holding plate of a recessing tool with safety cams for the prevention of the cutting insert being hurled out.
Figure 13:
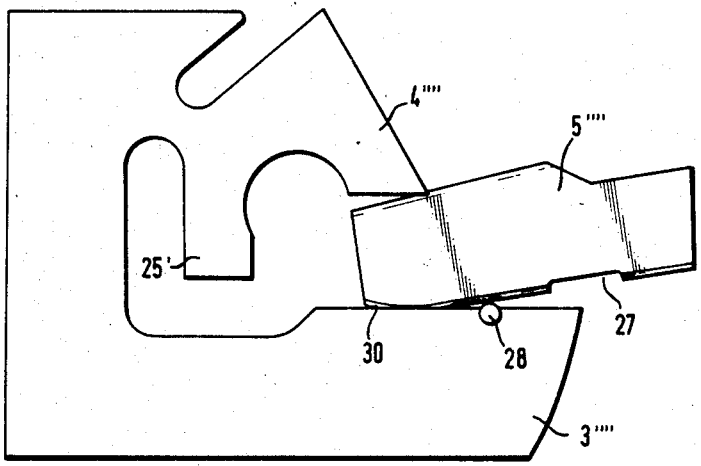
FIG. 13 is a view of the arrangement according to FIG. 1 during the mounting of the cutting insert.

FIGS. 12 and 13 show an embodiment of the clamped holding according to the invention, in which the insert limit contact point of the upper clamping jaw 4'''' is formed as an essentially L-shaped contact angle 25' adjacent to the back side 26 of the cutting insert 5''''. The cutting insert has a recess 27 on the bottom for a safety cam 28 projecting over the bearing area of the lower clamping jaw 3'''' which, even in the case of the appearance of strong pulling forces working on the cutting body (particularly centrifugal forces in rotating tools), prevents the cutting insert 5'''' from being hurled out. It is obviously not mandatory that the recess 27 allows a certain play, as provided in the embodiments according to FIGS. 12 and 13. On the contrary, the recess 27 could be adjusted to the form of the projecting cam 28. In order to be able to insert the cutting insert 5'''' in a simple fashion and without having to expand the upper clamping jaw 4'''' too much, in spite of the projection of cam 28, the back lower corner of the clamping portion 29 has a rounding 30, enabling an angular insertion, as shown in FIG. 13.

Figure 14:
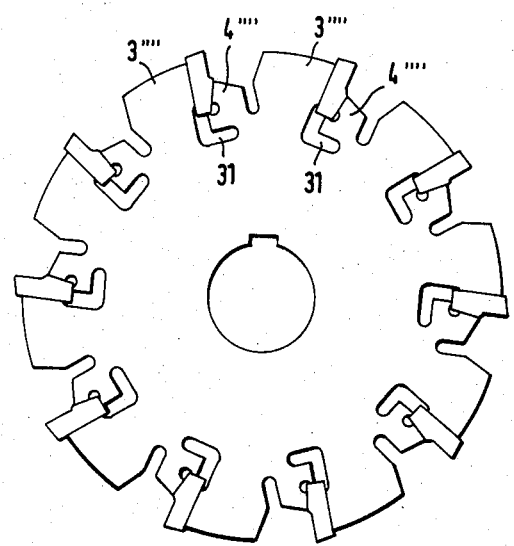
FIG. 14 is a saw blade with clamped holding of the cutting teeth according to FIGS. 12 and 13.

FIG. 14 shows a saw blade, in which the individual cutting teeth are held by a clamped holding according to FIGS. 12 and 13. The particular design, i.e., the formation of the clamping jaw 3'''' and 4'''' providing particularly the L-shaped cut in 31 as well, leads to a particular stability of the saw blade as a consequence of the pre-tensioning, as well as to a high ventilation effect with air and water. Thus, the very high amounts of heat resulting when working can be carried off in a relatively simple and unproblematic fashion.

Figure 15:
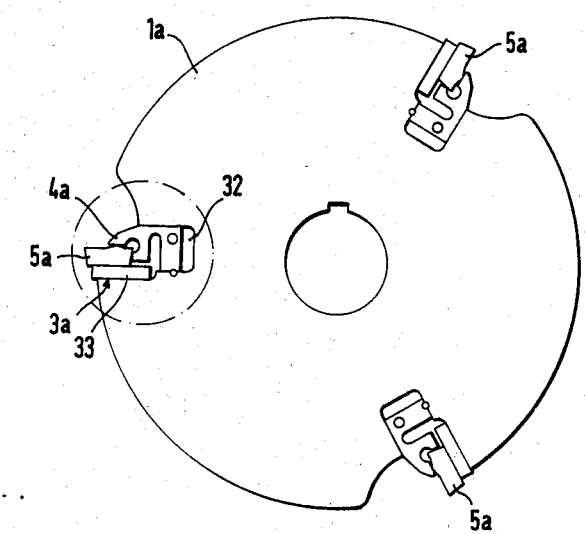
FIG. 15 is a multiple milling tool for the clamped holding of cutting plates in which the upper clamping jaw is a component which is loosely mounted in a recess.
Figure 16:
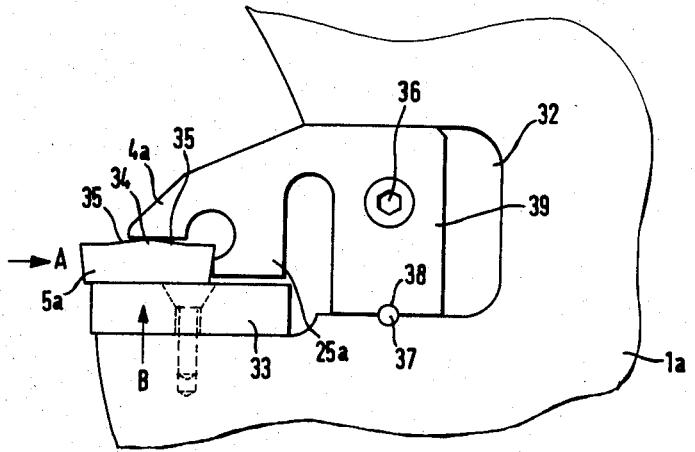
FIG. 16 is an enlarged side view of one of the clamped holders in FIG. 15.

FIG. 15 shows a milling tool designed as a triple tool in which the individual cutting plates 5a are held by a corresponding clamped holding, becoming proportionally stronger with cutting pressure, as already described in the previous figures. The critical difference consists in the fact that the clamping portion is not a one-component holding plate, but that the upper clamping jaw is a component loosely mounted in a recess 32 of holding part 1a, which can thus be screwed in and out, while a wall of the recess 32 forms the lower clamping jaw 3a, being brought onto an exchangeable base plate 33 in the depicted example of execution. Particularly in heavy metal cutting, it can happen that not only the plate but also the holder is damaged. The separation of the clamping jaws 3a and 4a enables the exchanging of the damaged upper clamping jaw 4a for a new component. The holding can be seen in FIGS. 16 to 19.

Figure 17:
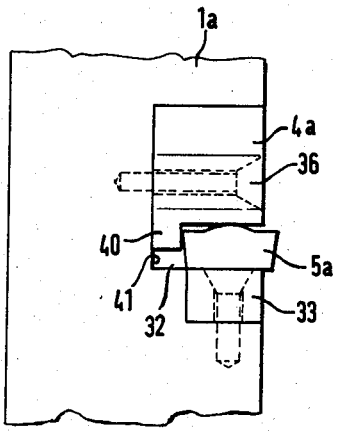
FIG. 17 is a view of the plate clamping according to FIG. 16 looking in the direction of arrow A.
Figure 18:
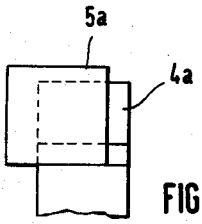
FIGS. 18 and 19 are views looking in the direction of arrow B in FIG. 16 for various plate shapes.
Figure 19:
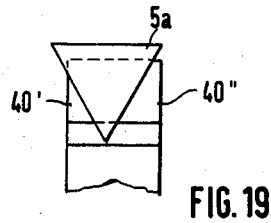

In order to accomplish the desired pre-clamping tension, cutting plate 5a has an arching 34 forming gliding ramps 35 on both sides. Thus the upper clamping jaw 4a is automatically opened when pushing in or striking in the cutting plate 5a without the need for special expansion tools. The insert limit contact point 25 formed as an essentially L-shaped contact angle, provides an automatic proportional increase of the clamping pressure with increasing cutting pressure, in this plate holding as well. The fastening of the component comprising the upper clamping jaw 4a is accomplished by means of a fastening screw 36 in the illustrated example, as well as by a tilt contact point in the form of a transverse pin or bolt 37, which engages into an opening 38 at the bottom end of bearing portion 39 of the loose component. FIGS. 17 and 18 indicate that the lateral contact point 40 for the cutting plate 5a is formed together with the upper clamping jaw 4a, although this, especially in the case of such a rectangular plate, could be formed through side wall 41 of recess 32 of the holder 1a. It is particularly favorable if the lateral contact point for the clamping plate is adjusted or molded for the clamping plate in more complex cutting plate shapes, for example, the triangular plate shown in FIG. 19. In this case, as a consequence of the lateral contact points 40' and 40", a special insert limit contact point 25a is no longer necessary.

The invention is not limited to the illustrated examples. In particular, for the fastening of several holding plates in a multiple recessing tool, a fast mounting frame would be possible in the recess of a large holder with fitting grooves provided on the upper or lower edge of the holding plate 1 into which corresponding counter fitting ribs of the mounting arrangement would engage: Such a fast mounting arrangement is the object of a parallel application.

I claim:

1. A tool for cutting material comprising a holding member having a slit-like opening forming a rigid jaw and an expandable jaw spaced from one another, an elongated cutter insert having a cutting edge and mounted between said spaced jaws in said slit-like opening, positioning-stop means on said expandable jaw positioning said cutter insert in a predetermined position in said opening, said expandable jaw having a front end portion and a rear end portion, said rear end portion constituting a spring part having a reduced thickness spaced laterally of said opening further from said rigid jaw than from said front portion to thereby permit said expandable jaw to be sprung at said spring part such that said expandable jaw is thereby movable relative to said rigid jaw by application of a separating force so that said cutter insert is inserted between said rigid and expandable jaws and clampingly retained therebetween, said spring part being spaced laterally from an imaginary longitudinal extension of said cutter insert such that cutting pressure applied to said cutting edge of said cutter insert by said material being cut in a direction parallel to the direction of feed of said holding member urges said cutter insert against said positioning-stop means to thereby urge turning of said expandable jaw about said spring part and thereby urge said expandable jaw towards said rigid jaw to provide an increase of the clamping pressure proportional to the increase of said applied cutting pressure to said cutting edge of said cutter insert.

2. A tool according to claim 1, wherein said slit-like opening is constructed and arranged such that said spaced jaws are adapted to be separated for inserting said cutter insert therebetween, by inserting an expansion tool into said slit-like opening.

3. A tool according to claim 2, wherein said slit-like opening has at least a partial oval configuration for receiving said expansion tool.

4. A tool according to claim 1, wherein at least one of said spaced jaws has a receiving portion with an indented section, said cutter insert having an external section conforming to said indented section and received in said receiving portion.

5. A tool according to claim 4, wherein said receiving portion has a generally V-shaped configuration.

6. A tool according to claim 1, further comprising a second slit-like opening in said holding member for facilitating making said expandable jaw expandable relative to said rigid jaw.

7. A tool according to claim 1, wherein said holding member has a threaded opening for receiving a clamping screw, said threaded opening being spaced from said slit-like opening, said threaded opening being substantially parallel to said slit-like opening, said clamping screw having a conical head.

8. A tool according to claim 1, wherein said positioning stop means comprises a substantially L-shaped section on said expandable jaw, said cutter insert having a longitudinal end which abuts said positioning-stop means.

9. A tool according to claim 1, wherein said cutter insert has a groove on the bottom side thereof, and a pin element disposed between said cutter insert and said rigid jaw in the area of said groove.

10. A tool according to claim 9, wherein said cutter insert has an inner longitudinal end adapted to be inserted into said slit-like opening, said cutter insert having a rounded bottom end portion adjacent to said inner longitudinal end.

11. A tool according to claim 1, wherein said slit-like opening in said holding member has a first section forming said expandable jaw for contacting said cutter insert and a second section, said second section being separated from said first section by an arcuate section, said second section defining said positioning-stop means and abutting the longitudinal end of said cutter insert.

12. A tool according to claim 1, wherein said holder member comprising a expandable holding part constituting said first jaw and a rigid holding part constituting said second jaw, said second holding part having a lateral opening, said first holding part being partially disposed in said opening, fastening means fastening said second part to said first part, and tilting means disposed between said first and second holding parts providing for tilting of said first holding part relative to said second holding part.

13. A tool according to claim 12, wherein said tilting means comprises a transverse pin element.

14. A tool according to claim 12, wherein said cutter insert has an upper side with a raised section contacting said expandable jaw, said raised section forming a guiding ramp and providing for clamping tension between said expandable and rigid jaws.

15. A tool according to claim 1, wherein at least two holding members are provided, clamping means clamping said two holding members on a holder element, said two holding members being substantially parallel to each other, and adjusting means on said two holding members for adjusting the distance therebetween.

16. A tool according to claim 15, wherein said adjusting means comprises at least one screw element threaded into one holding member and abutting the other holding member, and a threaded member passing through said one holding member and threaded into said other holding member.

17. A tool according to claim 1, wherein said cutter insert has an outer end section, an inner end section and an intermediate section between said inner and outer end sections, said expandable jaw being constructed such that said front end portion of said expandable jaw contacts said intermediate section of said cutting insert with a clamping force having a force component directed toward said inner end section of said cutter insert such that said force component resists withdrawal of said clamped cutter insert from between said first and second jaws.

18. A tool for cutting material comprising a holding member having a slit-like opening forming a rigid jaw and an expandable jaw, an elongated cutter insert having a cutting edge and mounted between said jaws in said slit-like opening, positioning-stop means on said expandable jaw positioning said cutter insert in a predetermined position in said opening, said expandable jaw having a front end portion and a rear end portion, said slit-like opening having an inner section extending to a position which is spaced laterally from an imaginary longitudinal extension of said cutter insert to define a spring part between said inner section of said slit-like opening and said rear end portion of said expandable jaw, said spring part having a reduced thickness spaced laterally of said opening further from said rigid jaw than from said front portion to thereby permit said expandable jaw to be sprung at said spring part such that said expandable jaw is thereby movable relative to said rigid jaw by application of a separating force so that said cutter insert is inserted between said rigid and expandable jaws and clampingly retained therebetween, said spring part being spaced laterally from an imaginary longitudinal extension of said cutter such that cutting pressure applied to said cutting edge of said cutter insert by said material being cut in a direction parallel to the direction of feed of said holding member urges said cutter insert against said positioning-stop means to thereby urge said expandable jaw towards said rigid jaw to provide an increase of the clamping pressure proportional to the increase of said applied cutting pressure to said cutting edge of said cutter insert.

19. A tool for cutting material comprising a holding member having a slit-like opening forming a rigid jaw and an expandable jaw, a cutter insert having a cutting edge and mounted between said jaws in said slit-like opening, positioning-stop means on said expandable jaw positioning said cutter insert in a predetermined position in said opening, said expandable jaw having a front end portion and a rear end portion, said slit-like opening having an inner section extending to a position spaced from said rear end portion of said expandable jaw to define a spring part between said inner section of said slit-like opening and said rear end portion of said expandable jaw, said spring part having a reduced thickness spaced laterally of said opening further from said rigid jaw than from said front portion to thereby permit said expandable jaw to be sprung at said spring part such that said expandable jaw is thereby movable relative to said rigid jaw by application of a separating force so that said cutter insert is inserted between said rigid and expandable jaws and clampingly retained therebetween, said cutter insert being laterally spaced from said spring part such that cutting pressure applied to said cutting edge of said cutter insert by said material being cut in a direction parallel to the direction of feed of the holding member acts in conjunction with a moment arm determined by said lateral space between said cutter insert and said spring part to provide a turning force tending to turn said expandable jaw at said spring part to thereby apply an increased closing force to said jaws proportional to the magnitude of the cutting pressure applied to said cutting edge of said cutter insert.

20. A tool according to claim 1, wherein said holding member is elongated and has a longitudinal axis parallel to the direction of feed of said holding member and which is disposed at an acute angle relative to the longitudinal axis of said elongated cutter insert, said cutting pressure being applied to said cutting edge of said cutter insert by said material being cut in a general direction parallel to said longitudinal axis of said holding member urging said cutter insert against said positioning-stop means to thereby urge said expandable jaw towards said rigid jaw to provide said increase of the clamping pressure proportional to the increase of the last said applied cutting pressure to said cutting edge of said cutter insert.

* * * * *